United States Patent [19]

Fontana et al.

[11] Patent Number: 4,908,157

[45] Date of Patent: Mar. 13, 1990

[54] ELECTRICALLY CONDUCTIVE POLYMER CONCRETE COATINGS

[75] Inventors: Jack J. Fontana, Shirley; David Elling, Centereach; Walter Reams, Shirley, all of N.Y.

[73] Assignee: The United States of America as represented by the Department of Energy, Washington, D.C.

[21] Appl. No.: 199,405

[22] Filed: May 26, 1988

[51] Int. Cl.$^4$ ............................................. H01B 1/06
[52] U.S. Cl. ................................................... 252/511
[58] Field of Search ................. 252/511; 524/495, 496

[56] References Cited

U.S. PATENT DOCUMENTS 3,334,040  8/1967  Conrad et al. ..................... 252/511

Primary Examiner—Josephine Barr
Attorney, Agent, or Firm—Margaret C. Bogosian; James W. Weinberger; William R. Moser

[57] ABSTRACT

A sprayable electrically conductive polymer concrete coating for vertical and overhead applications is described. The coating is permeable yet has low electrical resistivity (<10 ohm-cm), good bond strength to concrete substrates, and good weatherability. A preferred formulation contains about 60 wt % calcined coke breeze, 40 wt % vinyl ester with 3.5 wt % modified bentonite clay. Such formulations apply evenly and provide enough rigidity for vertical or overhead structures so there is no drip or sag.

4 Claims, No Drawings

ELECTRICALLY CONDUCTIVE POLYMER CONCRETE COATINGS

This invention was made with Government support under contract number DE-AC02-76CH00016 between the U.S. Department of Energy and Associated Universities, Inc. The Government has certain rights in the invention.

BRIEF DESCRIPTION OF THE INVENTION

The present invention involves a sprayable electrically conductive polymer concrete coating that can be applied to vertical, overhead or inaccessible concrete surfaces that are reinforced with embedded steel. These sprayable coatings spread the current uniformly across the sprayed structures to stop or prevent deterioration on the concrete resulting from corrosion of the embedded steel. The formulations of the present invention can be used to prevent corrosion of the embedded reinforcing steel in concrete girders, piers, columns, beams, and elements of bridge substructures.

BACKGROUND OF THE INVENTION

In recent years, the deterioration of many concrete bridge structures has become a major maintenance problem. Although the deterioration of concrete is influenced to some degree by the quality of the concrete, loading conditions and environmental exposure, the primary cause of deterioration is the result of corrosion of the reinforcing steel. The reinforcing steel embedded in concrete is passive unless the concrete becomes contaminated with chlorides from deicing salts or saltwater spray from coastal waters.

Due to its open-cell structure, concrete can allow critical quantities of chlorides to permeate its structure to the level of the embedded reinforcing steel. The chloride ions in the presence of moisture and oxygen initiate the corrosion of the reinforcing steel. As the corrosion products are formed, there is an increase in the volume of the steel, thereby exerting tensile forces on the surrounding concrete. As these forces become larger than the tensile strength of the concrete, the concrete cracks, thus allowing additional paths for the intrusion of water and chlorides. Eventually the concrete spalls and/or delaminates, and the concrete structure can become completely deteriorated.

The use of impressed current cathodic protection (CP) in chloride-contaminated concrete bridge decks is well known. In the early CP systems developed for bridge deck applications, an electrically conductive asphaltic-concrete overlay was used which performed well but was not useful for overhead and vertical structures. Alternative CP systems utilize electrically conductive polymer concrete mortar in slots cut into the bridge deck surface or electrically conductive polymer concrete mortar strips on top of the concrete deck with a protective concrete overlay over them. However, none of these CP systems were appropriate for application to any concrete surfaces other than bridge roadways.

Recently, it has become increasingly clear that the protection of the bridge substructure is as important as the deck. The protection of vertical and overhead concrete elements has been hampered by the lack of a suitable material and application method to effectively distribute the electrical current over the entire concrete surface. The inappropriateness of the prior art CP systems for use in protecting bridge substructure elements has been overcome with the formulations of the present invention. In one embodiment of the present invention, there is provided an electrically conductive polymer concrete coating suitable for spray application to vertical or overhead concrete surfaces. The coating uniformly distributes the cathodic protection currents across the concrete surface and is permeable to allow gases generated within the concrete substrate during the cathodic protection operation to pass through the coating.

DETAILED DESCRIPTION OF THE INVENTION

The present invention cover sprayable electrically conductive polymer concrete formulations. Although there are numerous applications for these formulations, their preferred use is as a protective coating for bridge substructure elements. In general, these sprayable formulations can be used for application to any vertical and overhead steel reinforced concrete structures. The formulations of the present invention are electrically conductive polymer concretes. These polymer concretes hold the conductive filler in suspension and can be sprayed in thin uniform coatings. Once applied, the thin, uniform coating is permeable to gases produced during the cathodic protection so that these gases are not trapped below the surface; the coating also has low electrical resistivity ($<10$ ohm-cm), good bond strength to concrete substrates, and good weatherability. Commercially available spray equipment, such as that used in the fiberglass panel manufacturing industry, can be used to spray mixtures of the formulations on vertical or overhead surfaces.

The electrically conductive polymer concrete formulations of the present invention comprise a resin, a conductive filler, and an agent that will keep the filler in suspension so that the formulation has a usable life and can be used with conventional spray equipment. Resins appropriate for use in the present formulations include orthophthalic polyester resins, isophthalic polyester resins, and vinyl ester resins, with vinyl ester resins being preferred. The most preferred vinyl ester resins are Hetron 921, marketed by Ashland Chemical Company, and Dow 8084-05 marketed by Dow Chemical.

Suitable electrically conductive fillers include carbon black, coke breeze, and calcined coke breeze. Table 1 sets forth a description of the specific fillers that are preferred for use in the instant formulations. Of the fillers listed in Table 1, calcined coke breeze is the preferred filler.

TABLE 1

| Electrically Conductive Fillers | | |
|---|---|---|
| Filler | Type | Manufacturer |
| Statex 160 | Carbon black | Cities Service Co. |
| Ketjenblack EC | Carbon black | Armack Company |
| Shamokin coke breeze | Coke breeze | Shamokin Filler Co. |
| Asbury 4335 | Calcined coke breeze | Asbury Graphite Mills |
| Loresco DWI | Calcined coke breeze | Cathodic Engineering Co. |

A thixotropic agent is added to the formulations to keep the conductive filler in suspension. Suitable types of such agents include lightweight alumina silicate, such as P2000 manufactured by Fillite USA; fumed silica; and modified bentonite clays, such as Claytone. Modified bentonite clay is the preferred thixotropic agent.

The electrically conductive polymer concrete formulations of the present invention comprise approximately 50–60% by weight of the conductive filler and 40–50% by weight of the resin to which has been added a thixotropic agent. In a preferred embodiment, the formulation comprises between 50–60% by weight calcined coke breeze and 40%–50% by weight of a vinyl resin ester with modified bentonite clay as the thixotropic agent. The most preferred formulation is 60% by weight calcined coke breeze, 40% by weight DOW 8084 vinyl ester resin with 3.5% by weight modified bentonite clay thixotropic agent. This mixture, when applied as a thin coating, 10 to 15 mils thick, has a resistivity of <5 ohm-cm. The coating is about 50 percent as permeable as the portland cement concrete substrate; thus, it will allow any gases formed during the cathodic protection process to migrate through it. Coatings tested up to four months at current levels several times higher than normally used do not show any decay in bond strengths or weatherability.

EXAMPLE 1

The Permeability Properties of the Electrically Conductive Polymer Concrete Coatings Several slabs, in both a vertical and overhead mode, were sprayed with an electrically conductive polymer concrete using a 60 wt % Asbury 4335 calcined coke breeze and Hetron 921 vinyl ester resin that contained 3 wt % Cabo-O-Sil Thixotropic agent. The thickness of the coating was 40 to 60 mils thick. Additional slabs were sprayed using 60 wt % Asbury 4335 calcined coke breeze and 40 wt % Dow 8084 vinyl ester resin containing 3.5 wt % Claytone thixotropic agent. The thickness of the coating was 10 to 20 mils thick.

A 4 in. diameter core was taken from one slab of each resin type and sent to the research laboratory of the Federal Highway Administration for rapid permeability tests on the cores using the methodology of Whiting, Report No. FHWA/RD-81/119, Federal Highway Administration, Washington, DC, August 1981.

The core with the electrically conductive coating containing Hetron 921 resin had a permeability of 7,962 coulombs when the coating was facing the chloride solution and 5,634 coulombs when the concrete substrate faced the chloride solution. The core with the coating containing the Dow 8084 resin had a permeability of 5,990 coulombs measured with the coating facing the chloride solution.

With the conductive coating removed, the concrete substrate had a reading of 14,866 coulombs in one direction and 11,163 coulombs in the opposite direction. Both samples of electrically conductive coatings were approximately 50 percent as permeable as the concrete substrate. Thus, any formation of chlorine or hydrogen gas formed by the impressed cathodic protection current should be able to permeate through the electrically conductive coating and escape to the surrounding atmosphere and not get trapped in the concrete substrate below the coating interface.

EXAMPLE 2

Bond Strength of the Electrically Conductive Polymer Concretes

The bond strength of the electrically conductive polymer concrete coating to the concrete substrate was tested with an Elcometer Adhesion Tester. In this test, a 1-in$^2$ dolly is bounded to the coating surface with an epoxy resin. The coating is cut through to the concrete surface at the perimeter of the dolly. The instrument claw is engaged with the dolly and the lift force is applied. The indicator retains the value of the applied force when the dolly and coating separate from the concrete substrate.

Bond strength tests were performed on the coatings of Example 1 containing Hetron 921 and Dow 8084 resin. The bond strength of the Hetron 921 coating averaged 320 psi (2.2 MPa), and the coating with the Dow 8084 resin averaged 450 psi (3.1 MPa). Cores 3 inches in diameter were taken from both slabs and cycled in a freeze-thaw box as per ASTM C666 part A. The coating bond strength was measured after 100 and 200 freeze-thaw cycles. The bond strengths did not appear to decay as a result of the freeze-thaw cycling. The bond strengths are summarized in Table 2.

TABLE 2

| Bond Strength In PSI of Electrically Conductive Polymer Concrete Coatings | | | |
|---|---|---|---|
| RESIN | NUMBER OF FREEZE-THAW CYCLES | | |
|  | 0 | 100 | 200 |
| HETRON 921 | 317 | 313 | 307 |
| DOW 8084 | 450 | 440 | 430 |

Notes
1 - Bond strength tested with Elcometer Adhesion Tester. Values given are averages of three samples.
2 - 1 PSI = 6.89 × 10$^{-3}$ MPa.

EXAMPLE 3

Electrical Resistivity and Weatherability of the Electrically Conductive Polymer Concrete Coatings Four 4 ft. by 4 ft. by 4 in. (121.9 by 121.9 by 10.2 cm)-thick concrete slabs with a single mat of reinforcing steel, 6 in. (15.2 cm) on center in both the longitudinal and transverse directions were sprayed with an electrically conductive polymer concrete coating. Two slabs were coated with a mixture of 60 wt % Asbury 4335 calcined coke breeze and 40 wt % Hetron 921 vinyl ester resin with 3 wt % Cab-O-Sil. The other slabs were coated with a mixture of 60 wt % Asbury 4335 calcined coke breeze and 40 wt % Dow 8084 vinyl ester resin with 3.5 wt % Claytone. Each concrete slab contained 15 lb NaCl/yd$^3$ (240 kg NaCl/m$^3$) when they were cast. The reinforcing steel bars were welded together to insure positive contact. An anode slot 0.25 in. (0.635 cm) wide by 0.25 in. deep (0.635 cm) was cut in the center of the slab and a 0.031 in diameter platinum-niobium clad copper core anode wire was inserted in the slot and cemented in place using the same electrically conductive mix as the coating.

One slab of each resin system was put in an active impressed current cathodic protection system and run at approximately 2 mA current per square foot of concrete surface area (21.6 mA/m$^2$) and kept in an active CP system for three months at this current level. After three months, the current level was raised to 10 mA current per square foot of reinforcing steel surface area. This is 5 mA current per square foot of concrete surface (54 mA/m$^2$).

Tables 3 and 4 give the current and voltage readings over the time span that the slabs were under an active CP system.

There did not appear to be any deterioration of the conductive coating in any section of the slab. The bond strength of the coating to the concrete substrate was measured before the CP system was activated. The bond strength of the electrically conductive polymer concrete coating with the Dow 8084 resin was 350 psi (2.4 MPa) and with the Hetron 921 was 250 psi 1.7 MPa). After 4 months in an active cathodic protection system, the bond strengths were 325 psi (2.2 MPa) and 200 psi (1.4 MPa), respectively.

TABLE 3

Electrically Conductive Polymer Concrete Coating Using Hetron 921 Vinyl Ester Resin

| Total Operating Time | Operating Current mA | Operating Current V | Electrical Resistivity ohm-cm |
|---|---|---|---|
| 0 | 30 | 14 | 14.4 |
| 48 hr | 30 | 10.5 | |
| 1 wk | 30 | 5.0 | |
| 3 wk | 30 | 6.0 | |
| 5 wk | 30 | 6.0 | |
| 8 wk | 30 | 6.0 | |
| 0 | 80 | 19.0 | |
| 48 hr | 80 | 17.0 | |
| 1 wk | 80 | 27.0 | |
| 2 wk | 80 | 16.0 | 11.2 |

TABLE 4

Electrically Conductive Polymer Concrete Coating Using Dow 8084 Vinyl Ester Resin

| Total Operating Time | Operating Current mA | Operating Current V | Electrical Resistivity ohm-cm |
|---|---|---|---|
| 0 | 30 | 4.5 | 7.2 |
| 48 hr | 30 | 4.5 | |
| 1 wk | 30 | 3.3 | |
| 3 wk | 30 | 3.2 | |
| 5 wk | 30 | 3.3 | |
| 8 wk | 30 | 3.3 | |
| 0 | 80 | 9.0 | |
| 48 hr | 80 | 8.3 | |
| 1 wk | 80 | 10.0 | |
| 2 wk | 80 | 10.0 | 3.6 |

We claim:

1. An electrically conductive polymer concrete coating suitable for spray applications comprising approximately 50–60% by weight of an electrically conductive filler selected from the group consisting of carbon black, coke breeze, and calcined coke breeze and 40–50% by weight of a resin selected from the group consisting of orthophthalic polyester resins, isophthalic polyester resins, and vinyl ester resins, to which has been added a thixotropic agent, which maintains said conductive filler in suspension.

2. The coating of claim 1 wherein the conductive filler is calcined coke breeze.

3. The coating of claim 1 wherein the thixotropic agent is modified bentonite clay.

4. An electrically conductive polymer concrete coating suitable for spray application comprising 60% by weight calcined coke breeze and 40% by weight vinyl ester resin with 3.5% by weight modified bentonite clay.

* * * * *